Patented Mar. 9, 1926.

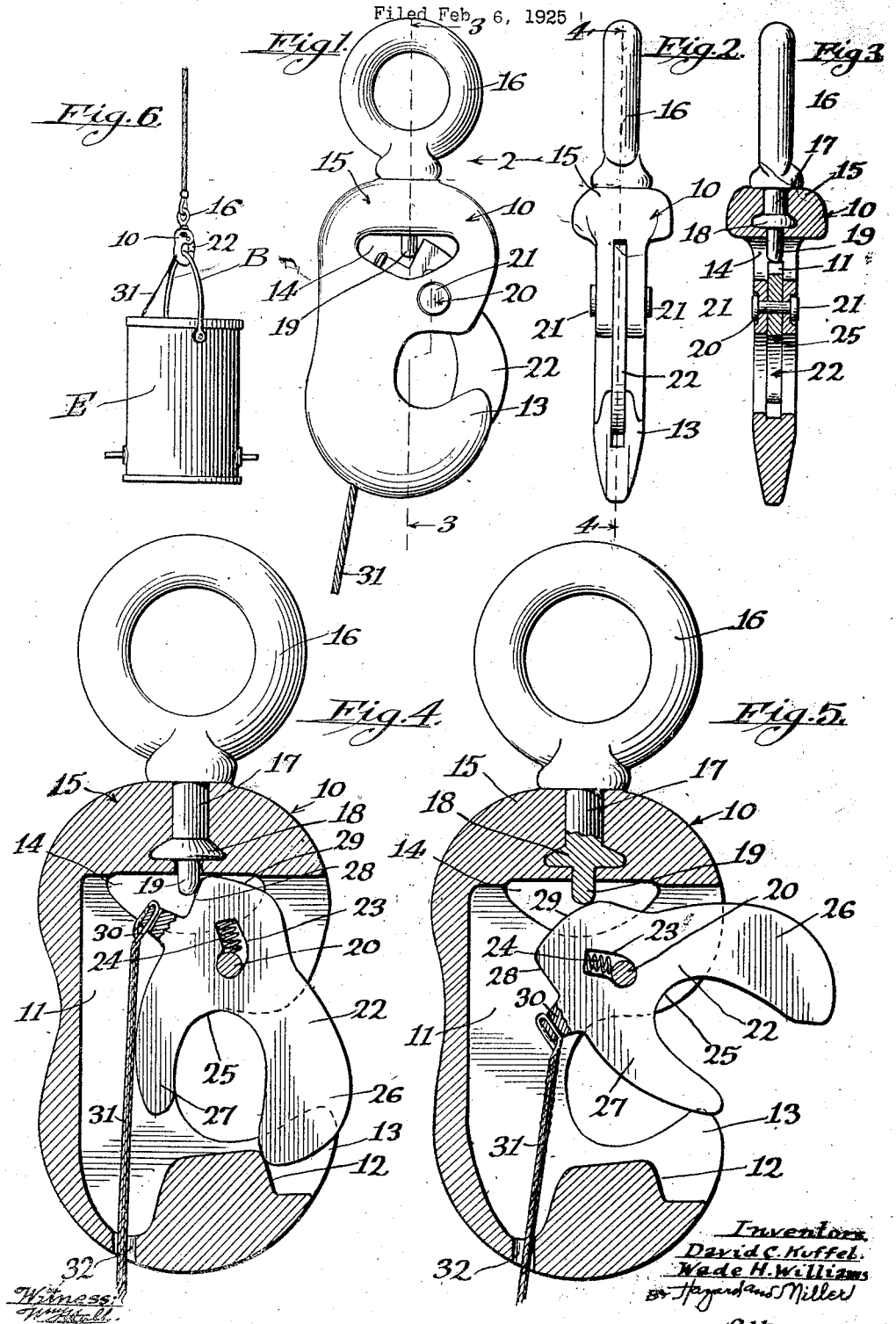

1,576,197

UNITED STATES PATENT OFFICE.

DAVID C. KUFFEL AND WADE H. WILLIAMS, OF LOS ANGELES, CALIFORNIA.

SAFETY HOOK.

Application filed February 6, 1925. Serial No. 7,268.

*To all whom it may concern:*

Be it known that we, DAVID C. KUFFEL and WADE H. WILLIAMS, citizens of the United States, residing at Los Angeles, in the county of Los Angeles and State of California, have invented new and useful Improvements in Safety Hooks, of which the following is a specification.

This invention relates to improvements in safety hooks.

It is an object of this invention to provide an improved safety hook, which consists essentially of a hook-shaped body and an improved guard means for locking a bail or other device which is placed in the hook therein, so that the bail cannot slip out of the hook or be removed without intentionally removing the guard device.

With the foregoing and other objects in view which will be made manifest in the following detailed description and pointed out in the appended claims, reference is had to the accompanying drawings for an illustrative embodiment of the invention, wherein:

Figure 1 is a side elevation of the improved safety hook;

Fig. 2 is a front elevation of the safety hook, and may be considered as taken in the direction of the arrow 2 upon Fig. 1;

Fig. 3 is a vertical section taken on the line 3—3 of Fig. 1;

Fig. 4 is a vertical section through the safety hook taken on the line 4—4 of Fig. 2, the guard device being shown in locking position;

Fig. 5 is a view similar to Fig. 4 with the guard device being shown in unlocking position; and Fig. 6 is a perspective view showing the improved safety hook in applied position.

Referring to the accompanying drawings wherein similar reference characters designate similar parts throughout, the hook of the improved construction consists of a hook-shaped body 10. A recess 11 is provided in the center of the hook-shaped body and may be formed by coring out, milling out, or otherwise removing the material in the center of the hook. The recess 11 is so formed as to provide a shoulder 12 adjacent the point 13 of the hook-shaped body 10. Adjacent the top of the body 10 there are formed apertures 14 which communicate with the recess 11 at its top. The apertures 14 define a bail portion 15 upon the body of the hook, and an eye 16 is provided with a shank 17 which extends into the bail portion 15 of the body 10. The shank 17 has an enlarged portion 18 disposed within the bail portion 15 so that the eye 16 has a swivel connection with the body 10. The lower end of the shank 17 is provided with a pin portion 19, constituting a locking pin, which extends downwardly through the top of the recess 11. A pin 20 extends transversely across the recess 11 and may be in the form of a rivet which has its heads 21 formed upon the outer sides of the hook body 10.

Within the recess 11 there is disposed a guard member 22 which has a slot 23 formed therein, through which slot extends the pin 20. The slot 23 is preferably slightly curved or slightly angular, as clearly shown in Figs. 4 and 5, and is of such length as to permit the guard member 22 to slide upon the pin 20 as well as rotate thereon. A coil spring 24 is disposed within the slot 23 and is compressed between one end of the slot and the pin 20, so as to urge the guard member 22 into a predetermined position with respect to the pin 20. A recess 25 is formed in the guard member 22 and serves to define a finger portion 26 and a thumb portion 27 therein. When the guard member 22 is in its locking position, the finger 26 is adapted to be disposed across the entrance to the hook and is limited in its rearward movement by engagement with the shoulder 12. When the finger 26 is swung away from the entrance to the hook, the thumb portion 27 is adapted to occupy a position across the entrance to the hook, and as the thumb portion is of less length than the finger portion 26, it clears the top of the shoulder 12. A shoulder 28 is formed upon the member 22, and when the guard member is swung into locking position, the shoulder 28 is adapted to be engaged by the locking pin 19 formed upon the shank 17. Extending forwardly from the shoulder 28 upon the member 22 there is formed a curved surface 29. An arm 30 is formed upon the member 22, and a flexible element 31, which may be a wire cable, is secured thereto and extends downwardly within the recess 11 through an aperture 32 formed in the bottom of the hook.

The operation of the hook is as follows: Assuming the hook to be initially in the position shown in Fig. 4 and it is desired to open the hook, the cable 31 is pulled downwardly. The guard member 22 cannot rotate upon the pin 20 because of engagement between the shoulder 28 and the pin 19. The guard member can slide relatively to the pin 20 in this position, and as the cable 31 is pulled downwardly, the coil spring 24 is compressed and the guard member is caused to slide downwardly relatively to the pin 20. This downward sliding movement of the member 22 causes the shoulder 28 to disengage from the pin 19. When the pin 19 is disengaged from the shoulder 28, the guard member 22 is free to rotate, and in this manner further pulling upon the cable 31 causes the guard member 22 to rotate and thus swing the finger 26 away from the entrance to the hook and cause the thumb 27 to occupy its original position. As the guard member 22 is rotated, the pin 19 merely slides upon the curved surface 29. When it is desired to place the bail B of an elevator E upon the hook, for example, the bail is swung into the recess 25 formed in the member 22. It engages the thumb portion 27 and forces the thumb 27 backwardly within the recess 11, thus rotating the member 22 in the opposite direction from that direction in which it is rotated to unlock the hook. As the thumb 27 moves backwardly, the locking pin 19 slides over the curved surface 29. This curved surface is so formed that as the locking pin 19 slides over the curved surface towards the shoulder 28, the guard member 22 will be urged downwardly so as to compress the coil spring 24. As the locking pin 19 reaches the end of the curved surface 29, the coil spring 24 lifts the guard member 22 so as to automatically cause a locking engagement to be again established between the locking pin 19 and the shoulder 28, which prevents rotation of the guard member 22. When the guard member 22 has again been locked, it is only possible to unlock the hook and remove the bail by pulling downwardly upon the cable 31.

From the above it is seen that an improved safety hook is provided, consisting essentially of a hook-shaped body, in which is formed a recess, and that a guard member is disposed within the recess, through which extends a pivot pin. The guard member is capable of rotation upon the pivot pin and may slide relatively thereto so as to disengage a locking means, which locking means is formed upon the shank of the eye 16, and a flexible element is provided, which, upon being pulled, will disengage the guard member from the locking means, permitting it to rotate and thus open the entrance to the hook. Furthermore, it is impossible by movement of the bail within the hook to open the guard member 22.

Although we have shown a flexible element 31 for operating or unlocking the guard member, it is contemplated within the scope of this invention to employ other means, and the guard member is capable of being disengaged by pulling downwardly upon the finger 26 by hand, so as to disengage the locking pin 19 from the shoulder 28 and permit the guard member to be rotated to open the hook.

It will be understood that various changes in the detail of construction may be made without departing from the spirit or scope of the invention as defined by the appended claims.

We claim:

1. A safety hook comprising a hook-shaped body, a recess formed in said body, a pin extending across said recess, a member disposed within said recess having a slot formed therein, through which said pin extends, a spring disposed within said slot for urging said member to assume a predetermined position with respect to said pin, a shoulder provided upon said member, a locking pin engageable upon said shoulder for locking said member against rotation upon said pin, and a finger formed upon said member adapted to extend across the entrance to said hook, these parts being so arranged as to permit sliding movement of said member upon said pin so as to disengage said locking pin from said shoulder, permitting rotation of said member so as to swing said finger away from the entrance to said hook.

2. A safety hook comprising a hook-shaped body, a recess formed in said body, a pin extending across said recess, a member disposed within said recess having a slot formed therein, through which said pin extends, a spring disposed within said slot for urging said member to assume a predetermined position with respect to said pin, a shoulder provided upon said member, a locking pin engageable upon said shoulder for locking said member against rotation upon said pin, a finger formed upon said member adapted to extend across the entrance to said hook, a thumb formed upon said member adapted to assume a position across the entrance to said hook when said finger is moved therefrom, and a flexible element secured to said member which, when pulled, is adapted to cause sliding movement of said member upon said pin so as to disengage said locking pin from said shoulder, permitting rotation of said member and thus swing said finger away from the entrance to the hook and cause said thumb to take its place.

3. A safety hook comprising a hook-shaped body, a recess formed in said body, a pin extending across said recess, a member disposed within said recess having a slot formed therein, through which said pin extends, a spring disposed within said slot for urging said member to assume a predetermined position with respect to said pin, a shoulder provided upon said member, a locking pin engageable upon said shoulder for locking said member against rotation upon said pin, a finger formed upon said member adapted to extend across the entrance to said hook, and a flexible element secured to said member adapted to produce sliding movement of said finger on said pin, so as to disengage said locking pin from said shoulder, permitting rotation of said member so as to swing said finger away from the entrance to said hook.

4. A safety hook comprising a hook-shaped body, a pin on said body, a member having a slot therethrough through which the pin extends, a spring disposed in said slot urging said member to assume a predetermined position with respect to said pin, means providing a shoulder on said member, and locking means on said body engageable on said shoulder for locking said member in its predetermined position, said member having a finger extending across the entrance to said hook when in said predetermined position, said member being so arranged that it may be caused to slide upon said pin against the action of said spring so as to disengage said shoulder from said locking means, and thus permit said finger to be swung outwardly from the entrance to said hook.

5. A safety hook comprising a hook-shaped body, a pin on said body, a member having a slot therethrough through which the pin extends, a spring disposed in said slot urging said member to assume a predetermined position with respect to said pin, means providing a shoulder on said member, and locking means on said body engageable on said shoulder for locking said member in its predetermined position, said member having a finger extending across the entrance to said hook when in said predetermined position, said member being so arranged that it may be caused to slide upon said pin against the action of said spring so as to disengage said shoulder from said locking means, and thus permit said finger to be swung outwardly from the entrance to said hook, there being a thumb formed on said body which is adapted to occupy the position across the entrance to said hook when said finger is removed therefrom.

In testimony whereof we have signed our names to this specification.

DAVID C. KUFFEL.
WADE H. WILLIAMS.